United States Patent [19]

Georg et al.

[11] Patent Number: 4,511,964

[45] Date of Patent: Apr. 16, 1985

[54] DYNAMIC PHYSICAL MEMORY MAPPING AND MANAGEMENT OF INDEPENDENT PROGRAMMING ENVIRONMENTS

[75] Inventors: Dennis D. Georg; Benjamin D. Osecky, both of Fort Collins, Colo.

[73] Assignee: Hewlett-Packard Company, Palo Alto, Calif.

[21] Appl. No.: 440,895

[22] Filed: Nov. 12, 1982

[51] Int. Cl.³ .............................................. G06F 1/00
[52] U.S. Cl. ................................................. 364/200
[58] Field of Search ... 364/200 MS File, 900 MS File

[56] References Cited

U.S. PATENT DOCUMENTS

| 4,037,209 | 7/1977 | Nakajima et al. | 364/200 |
| 4,145,745 | 3/1979 | DeBijl et al. | 364/200 |
| 4,376,297 | 3/1983 | Anderson et al. | 364/200 |

Primary Examiner—Raulfe B. Zache
Attorney, Agent, or Firm—John A. Frazzini

[57] ABSTRACT

In accordance with the illustrated preferred embodiment, a system and technique are presented which enable several independent software tasks, referred to as partitions, to be stored in memory and concurrently utilized without interfering with each other's operation. This system and technique also enable physical memory to be dynamically mapped so that various dynamic structures, including partitions, can be dynamically allocated memory as needed without interfering with each other. Some interaction between partitions is also made available so that results generated by operation of one of the partitions can be utilized by other of the partitions.

18 Claims, 8 Drawing Figures

DYNAMIC PHYSICAL MEMORY MAPPING AND MANAGEMENT OF INDEPENDENT PROGRAMMING ENVIRONMENTS

BACKGROUND OF THE INVENTION

The disclosed invention relates in general to the management of memory in a computer system having a number of independent programming environments, each of which consists of a varying number of dynamic structures. More particularly, the disclosed invention relates to a technique which minimizes or at least reduces interference between independent programming environments.

A problem which is apparent in the computer art is a need to efficiently manage computer resources so that the computer capabilities are fully utilized and realized. As memory size, computer speed and computing power have increased, it has become apparent that new generations of single user computers are becoming capable of handling a number of tasks concurrently. The single user can benefit from the flexibility of dedicating his computer to a single task or concurrently executing many tasks. It is therefore advantageous to develop a storage management technique which enables several tasks to be active at the same time without interfering with one another. Of particular interest in a single user computer is the ability to enter, edit and debug a program while other programs are being executed.

This multiplicity of active tasks increases the multiplicity of dynamic structures in the computer's storage further increasing the need to efficiently manage such structures. A storage management technique is therefore needed which reduces or minimizes unintentional interaction of independent tasks such as the movement of one task in memory in order to make memory available for another task.

In general, there are a wide variety of dynamic structures utilized in even a single user, single task machine. Programs entered into the computer are stored in memory, both in their original form as text and in machine executable form. Data structures of various kinds are stored in memory. Special data structures called stacks, into which data are stored and accessed in a Last In First Out Manner, are frequently used for temporary data storage and management of program control flow involving nested functions and subroutines. All of the above mentioned objects are dynamic structures in the sense that they require allocation, extension, and deallocation of memory over time.

To most efficiently utilize available memory, it is advantageous to dynamically allocate a variable amount of memory to these dynamic structures only as needed rather than to allocate each a fixed amount of memory. A fixed allocation results in much of such allocated memory being unused in most applications and also puts inflexible upper limits on the memory allocated to each of the structures. As discussed, beginning at page 77, in the text by P. J. Brown entitled "Writing Interactive Compilers and Interpreters", John Wiley and Sons, 1979, the use of more than one dynamic structure requires storage management strategies to avoid writing over the information in one dynamic structure with information in another dynamic structure. Typically, dynamic structures have one fixed edge and one movable edge at which information is added or removed. Memory management can be simplified somewhat by placing pairs of dynamic structures in memory back to back as in FIGS. 1A–1C so that the dynamic edges of paired structures expand away from each other. When two dynamic edges meet (such as the dynamic edges of structures 2 and 3 in FIG. 1B), then one or more of the dynamic structures must be moved to make memory available for these two dynamic structures. In FIG. 1C is shown an example in which dynamic structures 1 and 2 were moved up and dynamic structures 3 and 4 were moved down to make available unused memory for dynamic structures 2 and 3. This scheme enables maximum use of memory at the expense of time consuming movement of one or more blocks of memory. It also prevents the use of absolute pointers—all pointers must be relative to the fixed edge of its associated dynamic structure so that when its associated fixed edge is moved in a block move of memory, all pointers will remain valid. In any case, the space in which the dynamic structures have available to expand is limited by the two boundaries forming the upper and lower extremes of the address space.

In another common storage management technique, dynamic structures are not necessarily generated in a contiguous segment of memory, but instead when more storage is required a master routine takes a controllable amount of memory from a common pool and makes it available to the dynamic structure needing more memory. The various blocks of memory made available to a given dynamic structure are not necessarily contiguous, but instead are linked together by a linked list which enables a jump from the end of one block to the beginning of the next block. In some systems, as sections of memory become unused, they are automatically returned to the common pool. This approach has the disadvantage that lists use up some of the memory because of the pointer fields required for its implementation. This approach also can result in a program being stored in numerous small fragments thereby requiring numerous jumps during execution. For example, if an N×N matrix is entered and overlaps onto several of these fragments, then a standard matrix operation such as matrix multiplication or inversion can require many jumps during execution. Thus, the management of linked lists is complicated and subject to errors.

In another storage management technique, memory is divided into pages of equal length. As discussed beginning at page 77 of the text by Lance A. Leventhal entitled "Introduction to Microprocessors: Software, Hardware and Programming" published by Prentice Hall, Inc. in 1978, a primary motive for using paged memory is that the length of the address portion of an instruction in a direct addressing scheme can be reduced. In a paged address approach, the address of a memory location is indicated by a page number and a line number within the page. In accessing a given address in memory, its page number is loaded into a page register and then the line number within that page is indicated by the direct address instruction. Because the length of the number needed to indicate the line number within a page is typically smaller than the length of a number needed to indicate a given memory address, this technique reduces the length of the address portion of an instruction.

In the same manner as the linked list approach, pages of memory can be allocated to a given dynamic structure as needed. However, this technique suffers most of the disadvantages, discussed above, of the linked list approach. When a particular operation involves memory on more than one page, the page number in the page register must be changed at each jump between pages. Both of these techniques are inefficient in a virtual storage environment, because they tend to be scattered throughout memory, thereby requiring a large amount of swapping into and out of virtual memory. Also, both techniques are not suitable for taking advantage of numerous techniques for dealing with contiguous blocks of storage such as indexing, block moves, and searching. Therefore, a technique is needed which enables dynamic structures to grow or shrink without the need for time consuming block moves and which preserves the ability to store each structure in a contiguous block of addresses.

SUMMARY OF THE INVENTION

In accordance with the illustrated preferred embodiment, a system and technique are presented which enable several independent programming environments, referred to as partitions, to be stored in memory and concurrently utilized without interfering with each other's operations. In accordance with the disclosed invention it is recognized that addresses are utilized in two related but conceptually different contexts. In the first context, addresses are utilized in the system to represent an abstract location from which information is to be read or into which information is to be written. In the second context, addresses are concretely utilized to access a physical memory location to read or write data. In this invention, addresses in the first context are considered as being in a logical address space and in the second context are considered as being in a physical address space.

The association between the logical address space and the physical address space is a primary function of the disclosed technique. The advantage of this distinction between logical and physical address spaces is that the existing techniques for dealing with contiguous blocks of memory (e.g. indexing, block moves and searching) deal with the logical memory space. Therefore, dynamic structures can be entered into contiguous blocks of logical memory and allocated possibly noncontiguous blocks of physical memory as needed without the need for block moves of memory to enable a dynamic structure to grow.

The management of the system logical address space, and the association of the physical memory with parts thereof, are performed by an operating system. This operating system, and in particular the memory manager module of the operating system, is a system software module which manages memory allocation and provides services to effectuate the allocation, extension, and deallocation of dynamic structures. The main concept of this disclosure is the technique used to associate parts of the system logical address space with physical memory in a dynamic fashion.

The basis of this technique is the partitioning of the system address space into distinct ranges, called partition address spaces. Independent programming environments are then assigned a unique partition address space. The advantage of this partitioning scheme is that the dynamic structures within an independent programming environment conflict only with other dynamic structures from the same programming environment, and not with dynamic structures from other programming environments. The partitioning of the system address space provides many fixed edges in the system address space upon which to anchor dynamic data structures instead of the two fixed edges described in the prior art. Each programming environment then resides in its own partition logical address space. Because each partition logical address space is larger than the physical memory in the system, it imposes no new memory limitation on the programming environment. A single partition can still utilize all available physical memory.

The operating system's memory manager manages the allocation of physical memory to the various partition logical address spaces. Physical memory is associated with a similarly mixed block of logical address space only when required. The memory manager allocates physical memory to a particular partition in response to requests for dynamic structures in that partition. It is the responsibility of the memory manager to insure that any dynamic structures so allocated in the partition logical address space are also allocated the physical memory to correspond to that logical address space.

One partition of the system logical address space is used to manage memory which is not currently used by any programming environment. This dedicated partition contains all unallocated physical memory and cannot be used as a programming environment. When dynamic structures of sufficient size from a partition are deallocated or when the entire partition is deallocated, physical memory is returned to this special partition. As the physical memory requirements of a partition expand, the memory manager allocates physical memory from this dedicated partition of unallocated physical memory to the partition needing additional memory. When all physical memory has been allocated to standard partitions and the partition of unallocated physical memory is exhausted, only then does the dynamic allocation of structures in one independent partition affect another partition.

The described method of associating logical addresses with physical memory is supported in hardware by a memory controller. Each memory controller supports 16 or 32 blocks of physical memory, depending on the density of the memory chips, where one block of physical memory represents 16 Kbytes. Associated with each block of physical memory is one mapper register, the contents of which determine the logical addresses to which the associated physical memory will respond. These mapper registers, which exist in the memory controller, can be written by the operating system's memory manager. The memory manager can associate any part of the system logical address space with a particular block of physical memory by writing that logical address into the mapper register corresponding to the block of physical memory.

The preferred embodiment utilizes a physical system which is expandable from a basic system containing one central processing unit (CPU), one input/out processor (IOP) and one memory controller (used to allocate physical memory to logical memory) with associated random-access memory (RAM) and read-only memory (ROM), to a large system having several CPU's, several IOP's, and up to 10 memory controllers each managing up to 4 banks of memory. Sixteen memory controllers could be accessed with the existing logical memory space, but physical constraints of IC board size and computer size limit the physical support to ten memory controllers. The memory controllers provide the interface between the memory and the rest of the system.

All communications among the processors or between the processors and memory are transmitted over a memory processor bus (MPB). Each processor connected to the MPB has an MPB interface which handles all communications and interactions between the processor and the MPB. It performs all operations required by the MPB protocol, allowing the timing and control to be transparent to the processor.

The memory controllers handle reading and writing memory for all channels. They provide the memory interface and generate all the necessary timing and control signals needed to access memory. By means of communications from one or more processors over the MPB to the controllers, logical memory address block numbers can be entered into registers in the memory controllers. Each of these registers is associated with a block of physical memory. A block of physical memory is mapped to a given block of logical memory by loading the block number of the given logical block into the register associated with that block of physical memory.

A system device accesses a given logical memory location by asserting on the memory processor bus a memory access word having the address of the logical memory location. The first portion of this address indicates the block number of the logical memory block containing the logical memory location and the rest of the address indicates the line number within that block. If the asserted logical memory location corresponds to a block number that has been entered into a memory controller register, then access is effected to the corresponding physical memory location. The logical memory is selected to be several times larger than the physical memory to enable independent logical memory dynamic structures called partitions to be generated which have a minimal effect on each other's operations. Each partition can have several of its own dynamic structures. Each partition is as large as the physical memory so that part or all of the physical memory can be mapped into a single partition. Because of this, as long as there are unallocated blocks of physical memory, dynamic structures within one partition can expand without requiring block moves of memory in any other partition. However, in the relatively rare cases in which all of the blocks of physical memory have been allocated to various partitions, then block moves of memory within one partition can sometimes empty an entire block of physical memory, thereby enabling it to be reallocated to the other partition to enable its dynamic structures to grow.

The logical memory partitions can be utilized to enter any set of independent structures such as distinct programs. Thus, each of a set of independent programs can be entered into its own exclusive partition and run concurrently. As long as there are unallocated blocks of physical memory, the dynamic structures in these programs can expand and contract as needed without requiring block moves of programming in other partitions. These programs can run concurrently in a time sharing arrangement in a single processor or can utilize more than one processor to further reduce the impact of the running of one program upon the running of another program. The execution of one program need effect the execution of another program only if both concurrently seek access to the memory access bus at the same time or if one program requires more memory at a time when all blocks of physical memory have been allocated.

It is sometimes advantageous to allow communication between two ostensibly independent programs. For example, one program can be actively monitoring and/or controlling an industrial process while a second program is analyzing data generated by the first program. Therefore, the preferred embodiment of the disclosed invention includes a global data segment which can be accessed by more than one dynamic structure to exchange information between dynamic structures.

DESCRIPTION OF THE PREFERRED EMBODIMENT

The Memory Management Technique

Figure 1A:
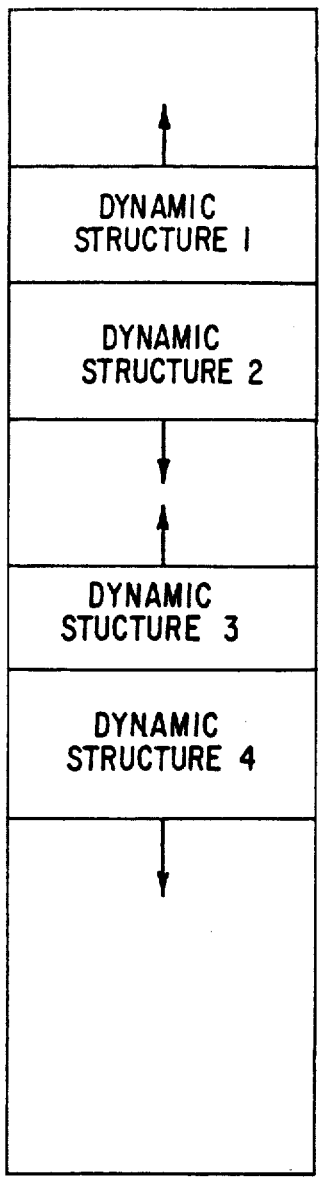
FIGS. 1A–1C illustrate memory management problems which arise when more than one dynamic structure is in memory requiring bulk moves of memory.
Figure 1B:
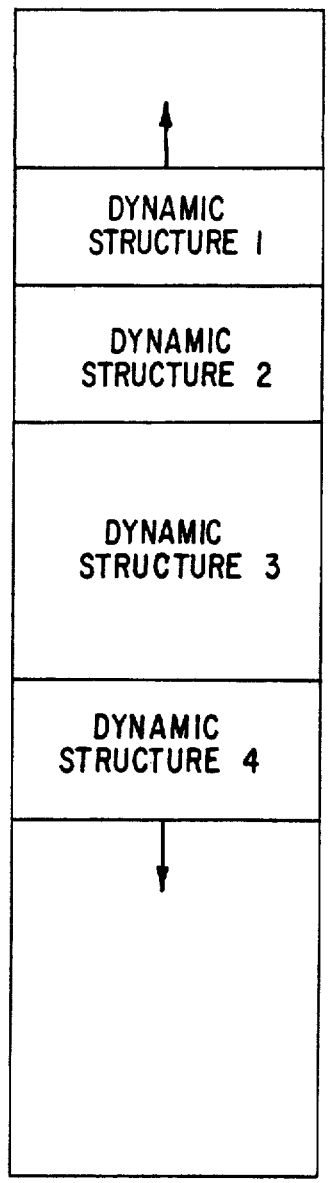
Figure 1C:
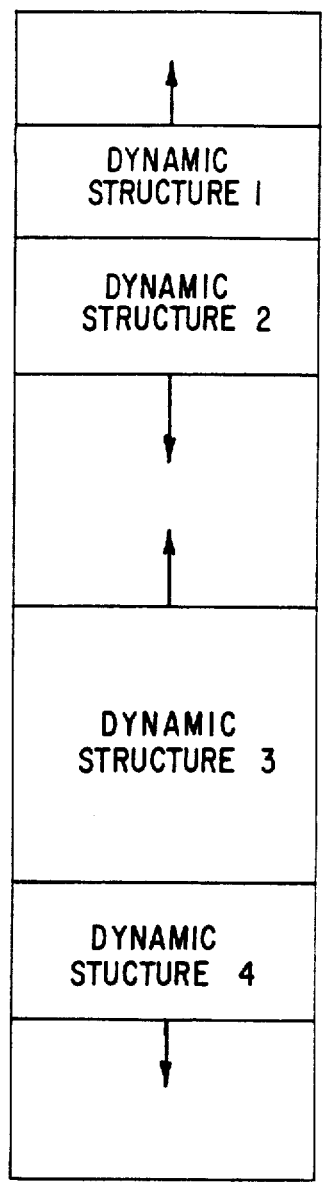
Figure 2:
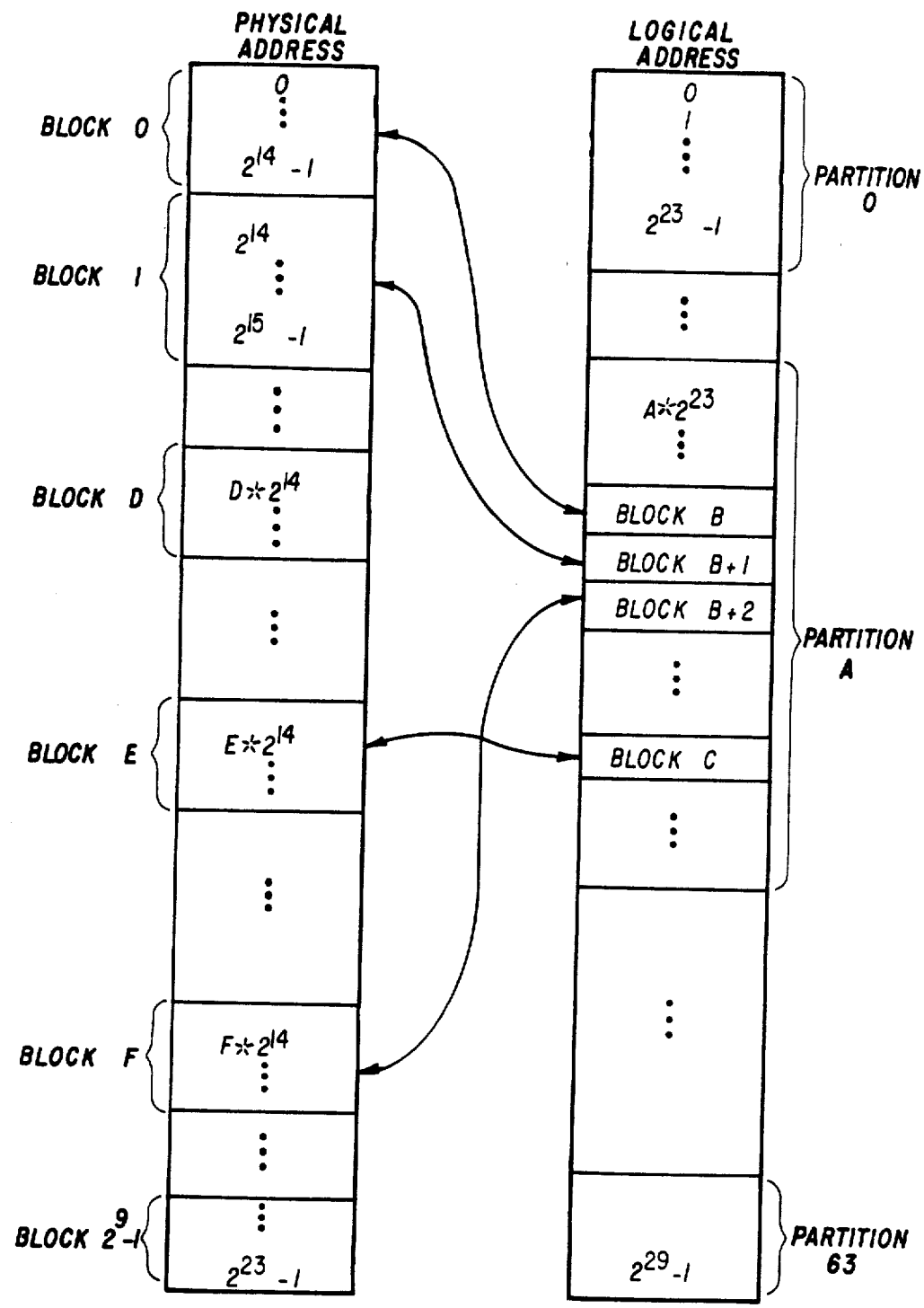
FIG. 2 illustrates the dynamic mapping of physical memory onto a logical address space to implement the dynamic mapping of physical memory.

In FIG. 2 is illustrated a memory management technique which enables a number of dynamic structures resident concurrently in memory to be dynamically allocated memory as needed with a minimal amount of unintentional interaction of the dynamic structures. At the left of that figure is shown the physical address space assigned to the physical memory locations in the computer and at the right of that figure is shown the logical address space. In the embodiment illustrated there, the physical memory has $2^{23}$ bytes of memory (i.e. 8,388,608 bytes of memory and sometimes denoted as 8M bytes of memory) which are divided into $2^9$ (i.e. 512) blocks each of which contains $2^{14}$ bytes of memory (i.e. 16,384 bytes of memory and sometimes denoted as 16K bytes of memory). Similarly, the logical address space has $2^{29}$ bytes (often denoted as 512M bytes of memory) which are divided into $2^6$ (i.e. 64) partitions each of which is subdivided into $2^9$ (i.e. 512) blocks of memory.

The size of a block is the same in both the physical address space and the logical address space so that physical memory can be mapped onto the logical address space a block at a time. Each partition is the same size as the physical address space so that unintentional interaction between partitions is minimized. This minimization results because each partition can be allocated the entire physical memory for a single task or, alternatively, more than one task can be in independent logical memory environments by allocating blocks of physical memory to various partitions in which these tasks are stored. Because each of the partitions is as large as the physical memory space, blocks of physical memory can be allocated to or deallocated from a given partition without requiring block moves of programming in another partition. Therefore, the 64 partitions function as independent programming environments and enable programming to be entered into the computer as if the computer contained 64 virtual computers.

The choice of block size is not critical but it is a convenient fraction of the physical memory. The logical address space is selected to be $2^{29}$ lines long because this can be accessed by a 32-bit word in which 3 of the bits are utilized to designate the function code of the word. There are 64 partitions because this divides the logical address space into partitions each of which can be allocated the entire physical memory. Obviously, other numerical choices could have been made for these parameters and as integrated circuit technology advances, other choices will become more convenient.

As shown in FIG. 2, blocks of memory required for a given task need not be contiguous in either the logical address space or in the physical address space. For example, suppose a given task is being programmed using part of the logical address space in partition A and that initially a first dynamic structure is needed for a dictionary and a second dynamic structure is needed for a Return stack to be utilized in keeping track of where to return from subroutine and function calls. Blocks 0 and 1 in the physical address space might be allocated to blocks B and B+1 in the logical address space to contain the first dynamic structure and block E in the physical address space might be allocated to block C in the logical address space to contain the second dynamic structure.

It is not necessary that either of these dynamic structures start at the beginning of partition A and therefore a gap is shown in partition A above block B. If later on in the generation of the program or during execution of the program, more memory is needed for dynamic structure 1, then such can easily be allocated from the physical address space—this is shown as the allocation of block F in the physical address space to block B+2 in the logical address space. Because the blocks between block 1 and block F might have been allocated in the meantime or for any other convenient reason, it is not necessary that block F be contiguous in physical memory with the block allocated to block B+1. It should be noted however that even though blocks 1 and F are not contiguous in physical memory, blocks B and B+1 are contiguous in the logical address space. Because the techniques adapted for handling contiguous memory (e.g. indexing, block moves and searching) utilize the logical memory space rather than the physical memory space, these techniques are applicable in this memory management scheme.

Supporting Hardware

Figure 3:
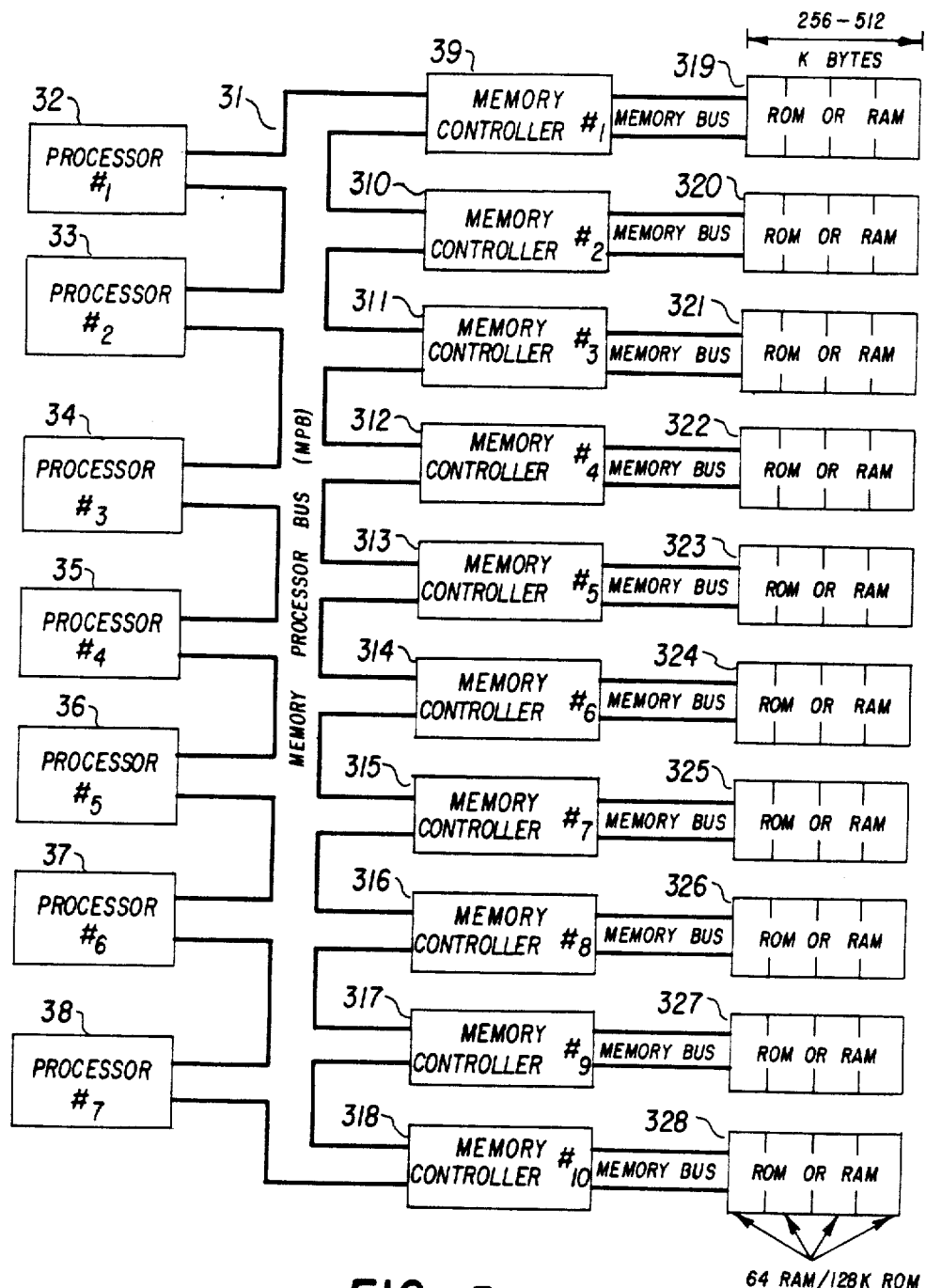
FIG. 3 is a block diagram of a system configured in accordance with the disclosed invention, having memory controllers to implement dynamic memory mapping.

A block diagram of hardware suitable for allocating blocks of physical memory to blocks of logical address space is shown in FIG. 3. The allocation of physical memory to logical address space is accomplished by a set of circuits called memory controllers. The system can include one or more central processing units, a memory processor bus (MPB) and up to sixteen memory controllers, each of which control up to four banks of memory. In the embodiment shown in FIG. 3, a memory processor bus 31 is connected to seven processors 32-38 and to ten memory controllers 39-318, each of which controls an associated one of the sets of memory banks 319-328. Each bank contains either 16K or 32K 32-bit words of RAM depending on the packing density.

All communications between a processor and memory or among the processors take place over the memory processor bus (MPB). Each processor connected to the MPB has an MPB interface. The MPB interface handles all communications and interactions between the processor and the MPB and performs all operations required by the MPB protocol, thereby allowing the timing and control of communications to be transparent to the processor.

The MPB supports a total of eight channels and each device connected to the MPB is assigned a channel number. Priority arbitration on the MPB is according to channel number, with lower channel numbers having higher priority. Channel 0 is reserved for the memory controllers so that their communications have highest priority on the MPB. Communications over the MPB are either between channels or between a channel and memory. Communication with a memory controller is effected over channel 0 whereas communications with memory occur by placing on the MPB a memory access word which is recognized by a memory controller as accessing a physical memory location over which it has control. Therefore, commands pass over channel 0 from one or more processors to the memory controllers to enter data into internal registers of the memory controllers to inplement the mapping of physical memory to the logical memory space. Likewise, the contents of registers in the memory controllers can be accessed over channel 0.

Figure 4:
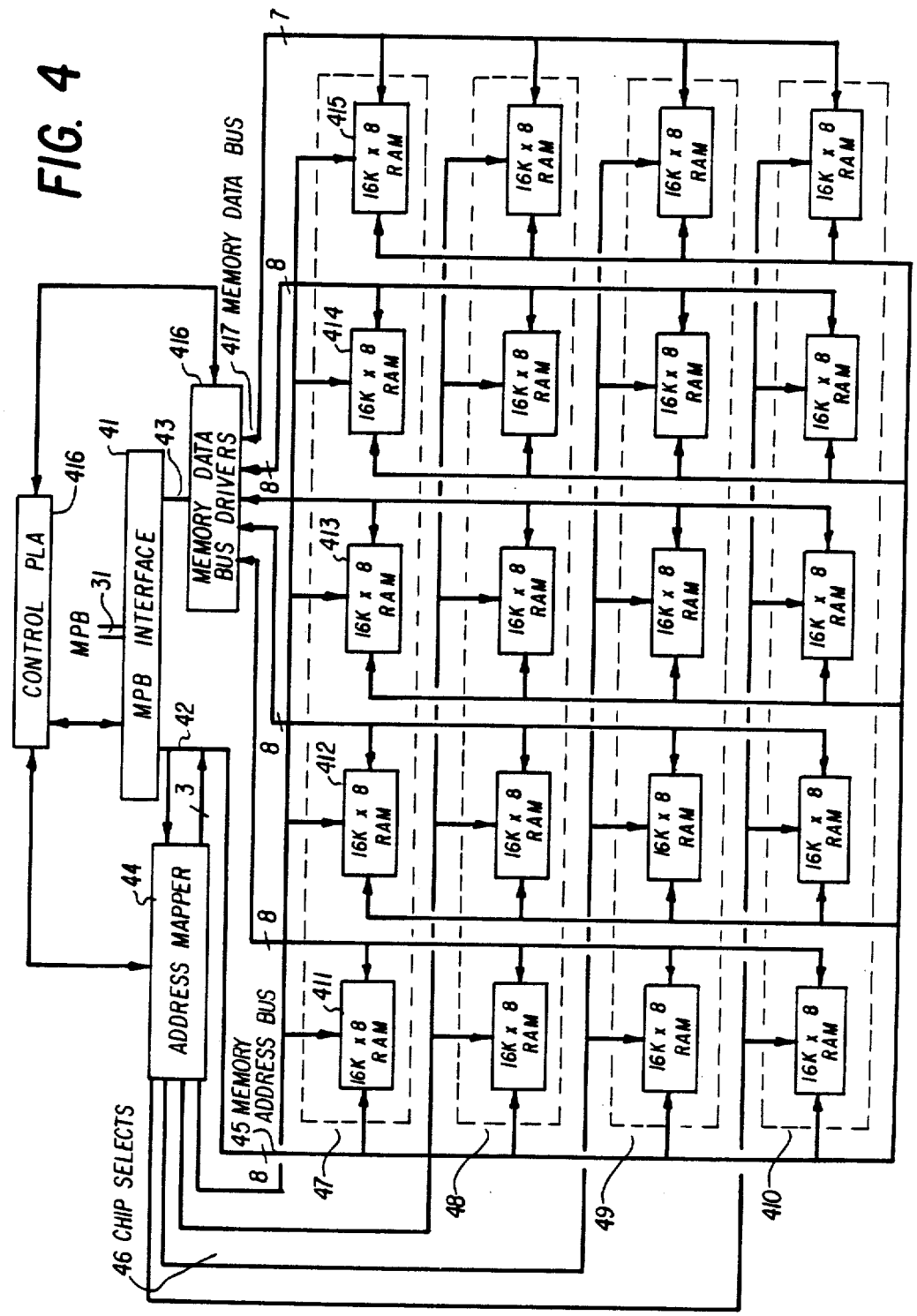
FIG. 4 is a block diagram of a memory controller and associated banks of memory controlled by the memory controller.

In FIG. 4 is shown a functional block diagram of a memory controller such as memory controllers 39-328 in FIG. 3. MPB 31 is connected to an MPB interface 41 in the memory controller to handle the interfacing of memory controller signals into and out of the memory controller. MPB interface 41 buffers addresses from MPB 11 to a memory controller address bus 42 and also buffers data to and from a memory controller data bus 43. Address buffer 42 is connected to an address mapper 44 which implements the dynamic allocation of physical memory to various dynamic program structures.

Address mapper 44 multiplexes mapped addresses onto a memory address bus (MAB) 45 and issues chip select signals over a set of four chip select (CS) lines 46. Each of the chip select lines 46 is connected to one of the four memory banks 47-410 and all four banks are connected to memory address bus 45. Each of memory banks 47-410 has five 16K×8 memory chips like chips 411-415 in memory bank 47. The memory controller also contains a programmable logic array (PLA) 416 which is the control center for the memory controller. The PLA regulates the routing of addresses and data, controls MPB interface 41, and arranges access to internal memory controller registers by other channels.

A 39-bit memory data bus 417 is connected to the memory chips to transfer data between the memory controller and the memory chips. This arrangement enables the memory to store 39-bit words in which 32 of the bits are utilized for data and seven bits are utilized for error detection. For the words stored in memory bank 47, bytes 0,1,2 and 3 of each word are stored in chips 411, 412, 413 and 414, respectively. The first 4K bytes in registers 411-415 in combination form a block of physical memory. Similarly, the second, third and fourth blocks of 4K bytes in registers 411-415 also in combination form three more blocks of physical memory. In the situation is which RAM's 411-415 are replaced with 32K×8-bit RAMs, each bank contains eight blocks of memory. Therefore, to accomodate either 16K or 32K RAMs, 32 physical address blocks are controlled by each memory controller. Thus, in FIG. 3, memory controller 39 controls the allocation of physical memory blocks 0-31, memory controller 310 controls the allocation of physical memory blocks 32-63, etc.. The system could accomodate up to 16 memory controllers so that the physical address space shown in FIG. 2 has $2^9$ blocks. However, because the preferred embodiment can only physically support 10 memory controllers, the actual physical memory space only has $10*2^5$ blocks of physical memory.

Figure 5:
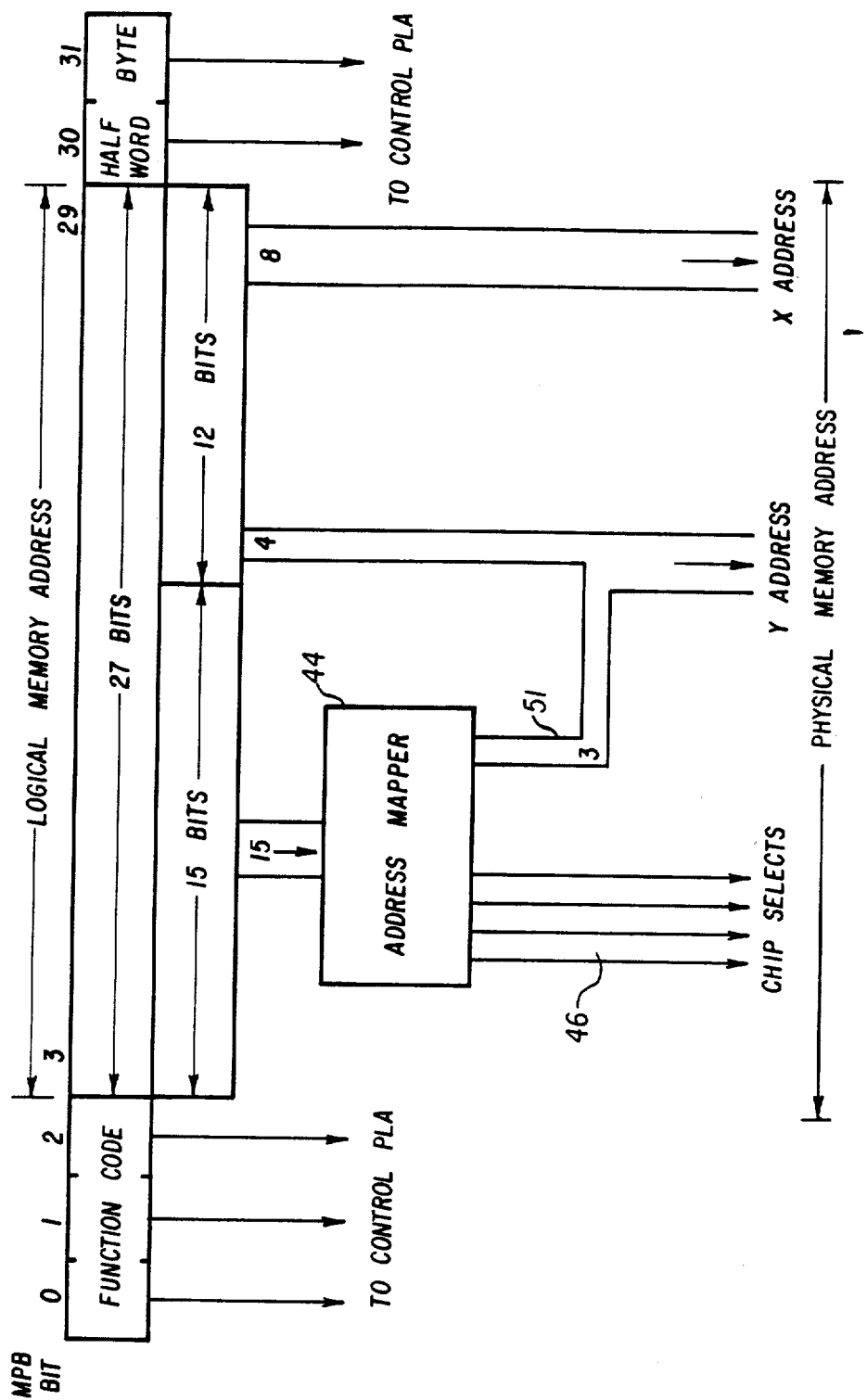
FIG. 5 shows the utilization of bits in a memory access word.
Figure 6:
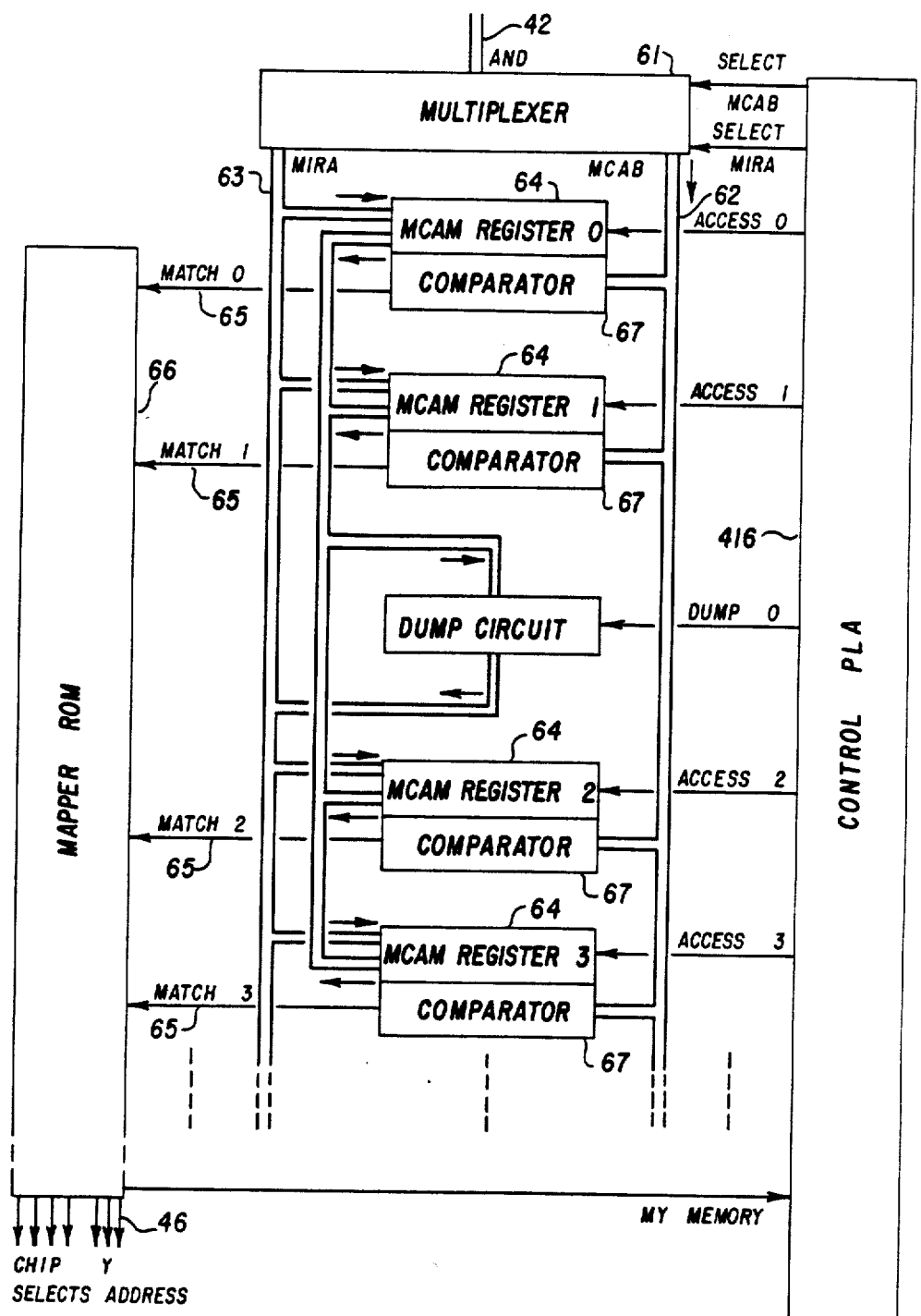
FIG. 6 is a block diagram of a memory mapper which effectuates the mapping of physical memory space into logical memory space.

The details of how physical address space is allocated to logical address space can be seen by reference to FIGS. 5 and 6. Address mapper 44 allocates physical memory to logical address space a block at a time. In FIG. 5 is shown the significance of the thirty-two data bits in a memory access word utilized to access memory. The PLA is responsive to bits 0-2 which are used to make up a function code indicating the type of memory access. These codes indicate whether memory is being accessed and, if it is, whether a full word, half word or byte are being accessed. When a half word is being accessed, bit 30 is utilized to indicate which half of the memory word is being accessed. When a byte is being accessed, bits 30 and 31 indicate which of the four bytes in a word are being accessed. The function code also indicates whether a word asserted on memory processor bus 31 is a channel-to-channel message used by one channel to communicate with another channel. The device sending the message is called the master and the device receiving the message is called the slave. In a channel-to-channel communication, bits 3-5 designate the number of the slave channel and the remaining twenty-four bits indicate the location within the slave. When a memory controller is accessed over channel 0, bits 6-9 indicate which memory controller is to be selected and bits 23-29 select the location within the memory controller to be accessed.

When a memory access word is placed on memory processor bus 31, PLA 416 responds to the function code in the address word to transmit the address portion of the word (i.e. bits 3-29) over address bus 42. Bits 3-17 contain the logical block number of the memory location being accessed and bits 18-29 indicate which line on that block contains the word being accessed. Because address mapper 44 allocates physical memory to logical address space a block at a time, only the fifteen bits 3-17 are mapped by the address mapper.

A block diagram of address mapper 44 is shown in FIG. 6. Addresses on address bus 42 enter mapper 44 at a multiplexer 61 which multiplexes address bus 42 to either a mapper content addressable bus (MCAB) 62 or a mapper internal register (MIRA) bus 63. Bus 63 is connected to a set of thirty-two mapper content addressable memory (MCAM) registers 64 each of which is associated with a block of physical memory in the four banks of memory controlled by this memory controller. These registers are each connected by a match line 65 to a mapper ROM 66 which makes the association between each MCAM register 64 and its associated block of physical memory. Each register 64 is also connected to an associated one of a set of comparators 67 which are utilized to check for a match between an input address on the address bus 42 and the contents of their associated MCAM register. When a memory access word is asserted on memory processor bus 31, each of the comparators 67 in all of the memory controllers 39-318 concurrently check for a match of the block number portion (i.e. bits 3-17) of the memory access word with the contents of its associated MCAM register 64. This avoids a time consuming sequential search of MCAM registers 64 for a match. The set of MCAM registers thus function as a very fast look-up table which effects the allocation of blocks of physical memory to blocks of logical memory. If the asserted logical block number does not match the contents of any of the MCAM registers in the memory controller, then all of match lines 65 remain low.

No two MCAM registers are allowed to have the same contents so that at most one of the thirty two match lines 65 in any given memory controller can indicate a match between the contents of an MCAM register and the logical block number asserted in a memory access word. Thus, there are only thirty-two different non-zero inputs to mapper ROM 66 over match lines 65. The mapper ROM translates these thirty-two different non-zero inputs into a high output on one of the four chip select lines and a 3-bit address which (as shown in FIG. 5) combines with bits 18-21 of the memory access word to form the Y address. The X and Y addresses are asserted in successive clock cycles to effect, along with the chip select lines, the access to the physical memory location allocated to the asserted logical memory address. As shown in FIG. 4, the chip select lines determine which of the four banks of memory 47-410 is accessed and the three bits of the Y address supplied by the mapper ROM select which 4K block of physical memory within that bank is accessed. The remainder of the X and Y addresses (i.e. the part which does not get mapped by mapper 44) selects the memory location accessed within the selected block of physical memory. When the memory bank contains $32K \times 8$ bit ROMs, all 32 possible outputs from a mapper ROM 46 are utilized. However, when the memory bank contains $16K \times 8$ bit RAMs, then the three bits of the Y address generated by mapper ROM 66 can only vary from 0 to 3 instead of from 0 to 7.

Each MCAM register 64 is sixteen bits wide and use fifteen of the bits to store the logical address block number to which its associated block of physical memory is allocated. The sixteenth bit is referred to as the map-out bit. In a comparison of the block number in a memory access word with the contents of the MCAM registers, the block number in the memory access word is treated as if it were a sixteen bit address with the sixteenth bit being zero. When the map-out bit is set, it ensures that a match cannot occur with the memory access word block number. This allows blocks of memory that have a number of defective locations to be made inaccessible. This bit may be inspected or changed via channel-to-channel communications. In response to channel-to-channel communications, the contents of the MCAM registers can be accessed over MIRA bus 63 to read from or write to the MCAM registers. This enables the contents of these registers to be varied to effectuate the dynamic mapping of physical memory.

Partition Environments

In order to dynamically map physical memory to logical memory, a method is required to select the particular block of physical memory that is to be mapped at any given request for memory allocation. In particular, a method is needed for handling the blocks of physical memory that have not been allocated for use by the operating system or by the system user. The MCAM register of an unallocated block of memory must not have the same contents as an allocated block or else it would be accessed by a memory access word. This is achieved by mapping all of the un-allocated blocks of physical memory into a single partition which is reserved for keeping track of un-allocated memory. The memory manager maintains a data structure which records which blocks of physical memory are not allocated to any usable part of the system logical address space.

By assigning each un-allocated physical memory block a different logical block number within that partition, an ordered list is achieved which facilitates the selection of which of these un-allocated blocks of physical memory is next to be allocated—namely, the next physical memory block to be allocated is the top entry in this list. These blocks of physical memory are mapped into a contiguous section of this partition so that keeping track of the top of this list is analogous to keeping track of the top of a stack. Thus, a pointer keeps track of the logical block number of the top of the list. When the top block is allocated, this pointer is updated to point to the entry which is now top on the list. Similarly, as blocks of allocated memory become unused, they are mapped to the top of the stack of un-allocated blocks to be available for subsequent requests for memory allocations.

When a memory access word is asserted on MPB bus 31, memory controllers 39-318 check to see if the logical block indicated by the memory access word matches the contents of any of its MCAM registers 64. If there is a match then the memory controller that finds the match places a signal on MPB bus 31 indicating that a match occurred. The memory controller detecting the match then completes the requested memory access by accessing the addressed word in memory.

If a request for a dynamic structure in a partition requires more physical memory than is available in that partition, and if all physical memory blocks have been allocated then block moves of memory (as described in the Background of the Invention) are initiated within the partition. If the memory allocated to that partition is substantially full so that block moves of memory would be a waste of time, then other partitions are checked to see if block moves can empty an entire block of physical memory which is then allocated to the needy partition.

Because each partition is as large as the physical memory but in general will only be allocated a portion of the physical memory, there is more room than normal in the logical address space to enter the dynamic structures. This will therefore reduce the frequency with which a dynamic structure in a partition expands into the logical memory used by an adjacent dynamic structure. However, when such does occur, block memory moves need to be implemented as discussed in the Background of the Invention. In general, these block moves will not require block moves in any other partition. Similarly, requests by one partition for physical memory allocation will not usually require block moves within the logical memory address space of any other partitions. However, in the infrequent situations in which substantially all of the physical memory allocated to a partition has been used and all of the blocks of physical memory have been allocated to various partitions, then block moves within another partition can sometimes free an entire block of physical memory which can then be reallocated to the other partition. Selected partitions containing programs which would be adversely affected by such intrusions can be protected by marking them as private. Such private partitions are not subjected to block moves of logical memory or reallocation of its allocated physical memory because of the needs of other partitions.

Each partition is an independent programming environment having all of the software structures such as code segments, segment tables, and stack segments needed for its independent operation. Each partition can also have within it, independent programming structures such as programs, subprograms and procedures. These independent structures can have their own local data segment for local variables and each partition also has a global data segment which can be accessed by any of the programming structures within it. The global data segment therefore enables some interaction between these independent structures by enabling them to exchange information with one another.

Through time sharing of a single CPU and/or by use of multiple CPUs, the independent programming structures can be executed concurrently. This is true for independent programming structures in the same partition as well as for structures in different partitions. In many cases, these independent programming structures perform independent but related operations and so it is advantageous to have the ability for them to exchange information even if it is only for the purpose of synchronizing the performance of more than one operation.

We claim:

1. A method of dynamically allocating to at least one data structure physical memory locations, each of which is accessible by a uniquely associated physical address, the set of all physical addresses associated with the physical memory locations being referred to herein as the physical address space, said method comprising the steps of:

assigning to each word of a data structure a unique logical address, each of said logical addresses being contained within a set of logical addresses referred to herein as the logical address space;

one-to-one mapping a set of physical addresses onto the set of logical addresses which have been assigned to a word of a data structure, whereby contiguous addresses within one of these address spaces are not necessarily associated by this map with contiguous addresses in the other address space; and storing each word of the data structure in the physical memory location whose physical address was mapped onto the logical address assigned to that word.

2. A method as in claim 1, further comprising the step of:

accessing a word stored in physical memory by means of a memory access word containing the logical address of that word, whereby contiguous words in a program can be stored in non-contiguous physical memory locations and still be accessed by contiguous locigal addresses, thereby simplifying utilization and manipulation of the words stored in memory.

3. A method as in claim 2, wherein the logical address space is partitioned into at least two partitions and wherein, in the step of assigning logical addresses to the words of the data structure, all of the logical addresses assigned to the words of the data structure are contained within one of the partitions, whereby growth of a first data structure in one partition will not require a second data structure in another partition to be reassigned logical addresses in order to make contiguous logical addresses available for use by the first data structure.

4. A method as in claim 3 wherein each of the partitions is at least as large as the physical address space, whereby the restriction of a data structure to a single partition does not result in a limitation on the number of words in the data structure.

5. A method as in claim 3 wherein each partition consists of a contiguous set of logical addresses.

6. A method as in claim 3 wherein one of the partitions, referred to herein as the inactive storage partition, is at least as large as the physical address space, said method further comprising the step of:
mapping into the inactive storage partition all of the physical address space that has not been mapped into another of the partitions, whereby the inactive storage partition keeps track of unused portions of the physical memory.

7. A method as in claim 6 further comprising the step of:
forming an ordered list of the physical addresses mapped into the inactive storage partition for use in selecting the next physical addresses to be mapped in the step of one-to-one mapping.

8. A method as in claim 7 wherein the portion of the inactive storage partition onto which the physical addresses corresponding to unused portions of the physical memory are mapped is a contiguous set of logical addresses, whereby an ordered list of the physical addresses corresponding to these unused portions of the physical memory is created in which these physical addresses are ordered by the relative value of the logical addresses to which they are mapped.

9. A method as in claim 2 wherein, in the step of one-to-one mapping the physical addresses onto the logical addresses, the physical addresses are mapped in equal sized blocks of contiguous physical addresses and the portion of the logical address space onto which each block of physical addresses is mapped is a block of contiguous logical addresses, whereby blocks of physical addresses are mapped one-to-one onto logical blocks.

10. A method as in claim 9 wherein the logical address space is partitioned into at least two partitions and wherein, in the step of assigning logical addresses to the words of said data structure, all of the logical addresses assigned to the words of said data structure are contained within a first one of the partitions, whereby growth of a first data structure in one partition will not require a second data structure in another partition to be reassigned logical addresses in order to make contiguous logical addresses available for use by the first data structure.

11. A method as in claim 10 wherein each of the partitions is at least as large as the physical address space, whereby the restriction of a data structure to a single partition does not result in a limitation on the number of words in the data structure.

12. A method as in claim 10 wherein each partition consists of a contiguous set of logical addresses.

13. A method as in claim 10 wherein one of the partitions, referred to herein as the inactive storage partition, is at least as large as the physical address space, said method further comprising the step of:
mapping into the inactive storage partition all of the blocks of physical addresses which have not been mapped into another of the partitions, whereby the inactive storage partition keeps track of unused blocks of physical memory.

14. A method as in claim 13 further comprising the step of:
forming an ordered list of the blocks of physical addresses mapped into the inactive storage partition for use in selecting the next block of physical addresses to be mapped in the step of one-to-one mapping.

15. A method as in claim 14 wherein the portion of the inactive storage partition onto which the blocks of physical addresses corresponding to unused portions of the physical memory are mapped is a contiguous set of logical addresses, whereby an ordered list of the blocks of physical addresses corresponding to these unused blocks of physical memory is created in which these blocks of physical addresses are ordered by the relative value of the logical addresses to which they are mapped.

16. A method as in claim 10 wherein some of the physical memory locations, whose associated physical memory addresses have been mapped into a first partition, are empty and wherein the number of these empty physical memory locations is at least as large as the number of locations in a block of physical memory, said process further comprising the steps of:
reassigning logical addresses to the words in the first partition, said reassigned logical addresses being within those logical blocks in the first partition to which physical address blocks were mapped and said reassignment being such that one of these logical blocks is emptied; and
storing each word, to which a logical address has been reassigned, in the physical memory location whose physical address was mapped onto the logical address reassigned to that word, whereby a first block of physical memory has only empty memory locations.

17. A method as in claim 16, further comprising the step of:
one-to-one remapping said first block of physical memory onto a block of logical memory in a second partition.

18. A method as in claim 17 wherein the second partition is the inactive storage partition.

* * * * *